United States Patent
Carter, II

(10) Patent No.: US 7,464,332 B2
(45) Date of Patent: Dec. 9, 2008

(54) DEVICES, SYSTEMS AND METHODS FOR SELECTING THE APPEARANCE OF A VIEWER DISPLAYING DIGITAL CONTENT

(75) Inventor: John Thomas Carter, II, Austin, TX (US)

(73) Assignee: AAA News, Inc., Austin, TX (US)

( * ) Notice: Subject to any disclaimer, the term of this patent is extended or adjusted under 35 U.S.C. 154(b) by 361 days.

(21) Appl. No.: 10/716,194

(22) Filed: Nov. 18, 2003

(65) Prior Publication Data

US 2007/0186170 A1    Aug. 9, 2007

(51) Int. Cl.
    *G06F 17/00* (2006.01)
(52) U.S. Cl. .................................................... 715/273
(58) Field of Classification Search ................ 715/744, 715/200, 273
    See application file for complete search history.

(56) References Cited

U.S. PATENT DOCUMENTS

| | | | | |
|---|---|---|---|---|
| 5,675,752 | A * | 10/1997 | Scott et al. ................... | 715/866 |
| 6,226,648 | B1 | 5/2001 | Appleman et al. | |
| 6,405,221 | B1 | 6/2002 | Levine et al. | |
| 6,448,987 | B1 | 9/2002 | Easty et al. | |
| 6,546,397 | B1 * | 4/2003 | Rempell ...................... | 707/102 |
| 6,806,887 | B2 * | 10/2004 | Chernock et al. ............ | 345/629 |
| 2002/0010658 | A1 * | 1/2002 | Suzuki et al. ................. | 705/28 |
| 2002/0070961 | A1 * | 6/2002 | Xu et al. ....................... | 345/738 |
| 2002/0174146 | A1 * | 11/2002 | Dang et al. .................. | 707/513 |
| 2003/0158916 | A1 * | 8/2003 | Cronin et al. ............... | 709/219 |
| 2003/0212762 | A1 * | 11/2003 | Barnes et al. ............... | 709/219 |
| 2004/0015538 | A1 * | 1/2004 | Agarwalla et al. .......... | 709/203 |
| 2004/0205588 | A1 * | 10/2004 | Purvis et al. ................. | 715/513 |
| 2005/0028089 | A1 * | 2/2005 | Aoki et al. ................... | 715/513 |
| 2005/0114757 | A1 * | 5/2005 | Sahota et al. ............. | 715/501.1 |
| 2006/0101332 | A1 * | 5/2006 | Imielinski et al. ........... | 715/513 |
| 2006/0212806 | A1 * | 9/2006 | Griffin et al. ................. | 715/523 |
| 2007/0180099 | A1 * | 8/2007 | Tsimelzon et al. .......... | 709/223 |
| 2007/0192716 | A1 * | 8/2007 | Hamada ...................... | 715/764 |

FOREIGN PATENT DOCUMENTS

| | | |
|---|---|---|
| WO | WO 01/06409 A1 | 1/2001 |
| WO | WO 02/03255 A2 | 1/2002 |
| WO | WO 03/025696 A2 | 3/2003 |

OTHER PUBLICATIONS

Yeddula, Generate Dynamic Content on Cache Server, Google May 1, 2002, pp. 1-54.*
Chakrabarti et al., Mining the Link Structure of the World Wide Web, Google Feb. 1999, pp. 1-12.*

* cited by examiner

Primary Examiner—Cong-Lac Huynh
(74) Attorney, Agent, or Firm—Matthew E. Burr

(57) ABSTRACT

The present invention is directed to devices, systems and methods for selecting the appearance of a display on a viewer that displays the output of a digital content server. Include tags, in html display, output custom or default information determined by the presence or absence of a unique identifier. In the event of perl-generated html, find and replace routines locate specific include tags and replace the include tags with custom or default information determined by the same unique identifier that dictates the selected viewer appearance. Accordingly, a vendor's web page may display content from a host's website while preserving the look and feel of the affiliate's web pages.

20 Claims, 1 Drawing Sheet

DEVICES, SYSTEMS AND METHODS FOR SELECTING THE APPEARANCE OF A VIEWER DISPLAYING DIGITAL CONTENT

FIELD OF INVENTION

The invention relates to digital information and its aesthetic appearance on a viewer. In particular, the invention relates to a system and methods for digitally based content providers to display electronic output in a selected, context sensitive, transparent manner.

BACKGROUND OF THE INVENTION

The 1990's were a remarkable period of explosive growth of the Internet. From a specialized system used by academia, the Internet has become a widespread medium for access to information and for electronic commerce.

The Internet was developed in the 1970's with funding from the Department of Defense to interconnect university and laboratory computer systems. In the early days, Internet usage was largely confined to academic users to send e-mail, chat and access remote files and computer resources. Early Internet application programs that, for example, performed e-mail, chat and remote data access functions, did not provide an easy to use graphical user interface (GUI). The development and wide adoption of the HyperText Transfer Protocol (HTTP) fueled, in large part, the rapid growth of the Internet. HTTP is the Internet protocol used to transfer documents and other Multipurpose Internet Mail Extensions (MIME) type data between Systems. HTTP is the protocol on which the World Wide Web ("the web") is based. To the Internet user, the web is an easy to use graphical user interface that provides "point-and-click" access to data from an enormous number of remote computers. Generally, the computers that provide the web content are referred to as servers and programs that allow the content to be viewed are referred to as browsers.

Internet computer communication is guided the standards of the Open System Interconnect (OSI) Model. The communication technology of the web can be explained by analogy to the OSI model for computer communication. The Transport Control Protocol/Internet Protocol (TCP/IP) of the web, however, divides networking functionality into only four layers, rather than OSI's seven layers: (1) a network interface layer that corresponds to the OSI link layer, (2) an Internet layer which corresponds to the OSI network layer (3) a transport layer which corresponds to the OSI transport layer and (4) an application layer which corresponds to the session, presentation and application layers of the OSI model. HTTP resides above the (TCP/IP) layers and provides a transfer protocol between the web server and the browser client. The web browser (client) may correspond to the application layer of the OSI model and Hyper-Text Markup Language may correspond to the presentation layer.

The Hyper-Text Markup Language (HTML) is the software language in which most of the web is written. HTML is basically ASCII text surrounded by HTML commands in angled brackets. A web browser interprets HTML commands to determine how to display a web page.

PERL is another software language. It is a widely known and well-respected scripting language. PERL is used for a variety of tasks, such as to create the equivalent of DOS batch files or C shell scripts, but in the context of Web development PERL is used to develop CGI scripts for dynamic graphical web pages.

The web, as a whole, is made up of web page servers and web browsers that provide a GUI environment that is hardware and operating system independent. A web browser is an application program that interprets and displays HTML pages. The web is independent of hardware and operating systems because the HTTP and HTML protocols and languages that are used between the web servers and the browser client applications are the same.

HTML web pages often contain HyperText links that locate and display (point to) other HTML pages on the web. By pointing and clicking on these links, a user can skip or "surf" from page to page on the web.

A primary function of a web browser is to display the page located at a Universal Resource Location (URL) address. A URL is a unique address that includes the protocol to reference the data, the system path and data filename. The data file addressed by the URL data filename is located on a server.

HTML supports the display of data is through "frames." A browser that supports frames has the ability to split the browser display area into separate "framed" display areas. Each display area, or frame, can contain information from a different web page and/or point to a different URL address. Frames can be created to present the user with a simultaneous coordinated presentation of multiple web pages while maintaining the look-and-feel of a single web page.

The ability to "bookmark" a page is another feature of most web browsers. Such web browsers store a plurality of bookmarked pages in a non-volatile storage medium where they may be retrieved when the browser is reactivated. A bookmark is a reference to a single URL address.

Bookmarks present a problem for web pages that are designed for display as multiple coordinated, or framed, web pages. A bookmark is a reference to a single URL address. A frame based web page, however, simultaneously displays multiple URL addressed web pages. Therefore, a bookmark created when viewing a frame based web page stores only one URL address, where multiple URL addresses are required to properly display the frame based data. When the user attempts to re-access the page with the bookmark, the browser display will only load one frame, which provides only part of the coordinated framed presentation of data.

Services such as Google®, Lexis/Nexis®, Yahoo™, Excite™, Lyco™, Infoseek™ and Hotbot™ provide a search engines for searching web pages and other information on the Internet. The engines return URL addresses of web pages and other data that satisfy the search criteria. For the most part, search engines use keyword and Boolean search strategy algorithms to find web pages and other information that satisfy the search parameters.

The present invention overcomes the limitations of bookmarks, affiliate commerce systems, frames and other strategies to deal with website egress. Other benefits of the present invention will become clear to those skilled in the art from the foregoing description.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION

Figure 1:
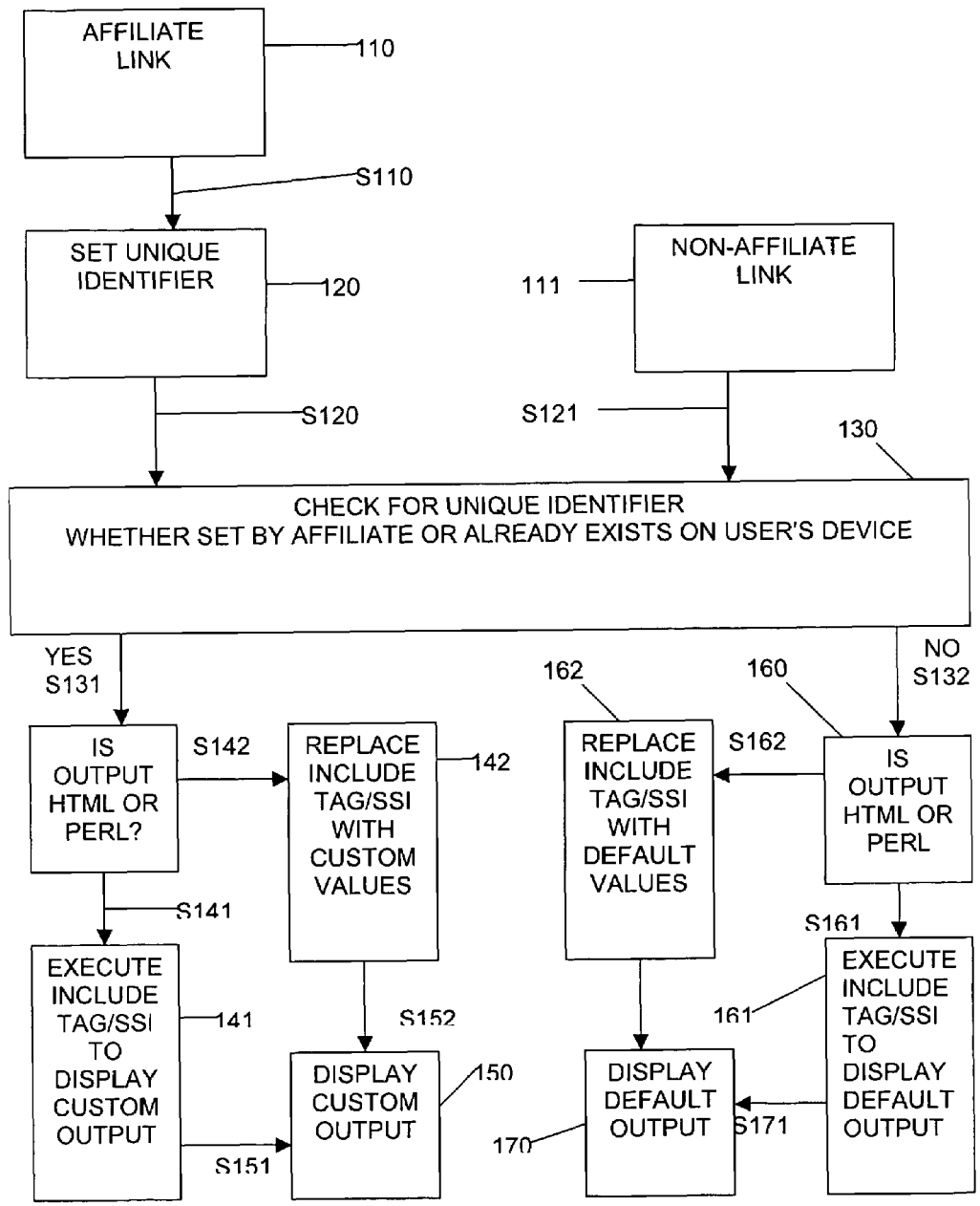
FIG. 1 is a block diagram showing a flow chart of a method of an exemplary embodiment of the invention.

In view of the foregoing, the present invention, through one or more of its various aspects, embodiments and/or specific features or sub-components, is thus intended to bring out one or more of the advantages that will be evident from the description. The present invention is described with frequent reference to computers, web browsers and web servers. It is understood that a computer is merely an example of a specific embodiment of the present invention, which is directed generically to digital content servers and viewers within the scope of the invention, and the terminology, therefore, is not intended to limit the scope of the invention.

As described above, the World Wide Web began as a simple GUI interface to the Internet using HTML as a way to link web pages through a browser. This allowed a researcher, for example, to embed "active" references in his or her documents that, if selected, would enable the reader to review the source of the reference first-hand. Programmers capitalized on the technology to create "web sites," laying the groundwork for the metaphorical "web" of content and interactive applications that exists today. In the early stages, website programmers (webmasters) increased visitor traffic to the website by placing links within their website to other websites, usually related in content or function, in exchange for a reciprocal link back to their own website. Directories of websites, such as Yahoo™, and search engines, such as WebCrawler™, began to appear in an attempt to organize the content of the Internet.

In the early days, the web was the domain of scientific and technical professionals, together with motivated hobbyists. A non-commercial, communitarian mindset prevailed where innovations and data were freely shared among the web community participants. Accordingly, link sharing developed into a standard practice on the web. Including and promoting a links page or a list of links, however, effectively encouraged people to leave the website.

Commercial exploitation of the web began once visitor traffic increased above a threshold level. Retail and for-profit websites sought ways to attract visitors, or "hits," to the website. They also experimented with various strategies and mechanisms by which the website could generate revenue. One such strategy was to sell, in the form of paid advertisements, the links they had previously provided for free.

Another strategy to increase hits and generate revenue from a website was to get the website URL picked up by search engines. Search engines and web directories became increasingly popular because the number of websites was growing geometrically, making it more difficult for users to find what they wanted. Additionally, the culture of free reciprocal links diminished in relative volume and commercial importance on the web. Search engines and directories became the most practical way to find the desired web content.

Banner advertisements displayed on websites emerged as a common approach on the part of corporate websites to get noticed. Internet advertising resulted in websites creating space for banner ads. The webpage advertisement space was termed "inventory." The ads were priced by CPM, as a print ad might be priced, or by cost per thousand impressions or "eyeballs" each ad attracted to the advertised website. Over time this pricing model gave way to arrangements more favorable to advertisers such as Cost Per Click-through and Cost Per Inquiry. That is, the advertiser pays only for each visitor that clicks on a banner ad and completes an information request form on the advertiser's site.

Some of the most successful Internet commerce websites (vendor websites) take an even more results-driven approach to the purchase of banner ads. They pay only for ads that, when clicked, result in a product sale. To provide a stronger incentive than a simple banner ad, these companies let third-party website owners list a portion of their goods and promote them as they choose within their websites. Initiatives such as these have come to be described as "affiliate programs," "associate programs," or "commission based advertising programs."

Affiliate programs have substantial and significant benefits. They constitute revenue-generating web content to the website owner, without requiring an investment in product inventory or additional infrastructure. Additionally, they create new revenue streams without reducing the website's available ad inventory. The most benefit, however, almost always accrues to the vendor website, not the affiliate. The vendor sites benefit from the marketing resources of the affiliate operators, and they lure visitor traffic away from the affiliate. The visitor is gone once he or she visitor clicks on an affiliate ad and enters an online store.

The use of frames to keep a shell of the affiliate's own website around the vendor's site has not proven to be a satisfactory solution to the problem of website egress under affiliate programs. Some Internet affiliate sales vendors have begun placing "return to referring website" links on their order confirmation screens, an approach that is also ineffective. The problem of website egress restricts participation in an affiliate program to less trafficked websites that are unconcerned about losing visitors. Search engines and directories, meanwhile, continue to increase in their usefulness and popularity, while banner ads and old-style links are losing effectiveness and popular usage.

Apart from frames and affiliate programs, many websites, and ecommerce websites particularly, use cookies to facilitate the customization of user preferences as a means for attracting and retaining visitors. A cookie is a piece of text that a web server stores on a user's hard disk. Cookies allow a web site to store information on a user's machine and later retrieve it. The pieces of information are stored as name-value pairs. For example, a Web site might generate a unique ID number for each visitor and store the ID number on each user's machine using a cookie file.

Machines that support Windows software such as Microsoft's Internet Explorer web browser to browse the Web often store cookies in a directory called c:\windows\cookies. Each file in the directory is a text file that contains name-value pairs. There is one file for each Web site that has placed cookies on the machine. Each of these files is a simple, normal text file. The file name identifies the Web site that placed the file on the machine. The information is also stored inside the file. Clicking on a file opens the file. A user's history of visiting a site is often found in a directory file having a .php file extension.

The cookie file for goto.com, for example, contains the following information:

UserID A9A3BECE0563982D www.goto.com/

Goto.com stored on the machine a single name-value pair. The name of the pair is UserID, and the value is A9A3BECE0563982D. The first time a user visits goto.com, the site assigns the user a unique ID value and stores it on the user's machine. There probably are several other values stored in the file after the three shown above. That is housekeeping information for the browser.

Amazon.com, in contrast, stores more information on a machine. The cookie file Amazon has creates on a machine contains the following:

session-id-time 954242000 amazon.com/
session-id 002-4135256-7625846 amazon.com/
x-main eKQlfwnxuF7qtmX52x6VWAXh@lh6Uo5H amazon.com/
ubid-main 077-9263437-9645324 amazon.com/

Amazon stores a main user ID, an ID for each session, and the time the session started on the machine-(as well as an x-main value, which could be anything).

The vast majority of sites store just one piece of information—a user ID—on a machine. However, a site can store many name-value pairs.

A name-value pair is a named piece of data. It is not a program. It cannot do anything. A Web site can retrieve only the information that it has placed on a machine. It cannot retrieve information from other cookie files, nor any other information from the machine.

Cookie data is name-value pairs stored on a hard disk by a Web site. The Web site stores the data, and later it receives it back. A Web site can only receive the data it has stored on a machine. The data moves in the following manner:

A URL of a Web site typed into a browser sends a request to the Web site for the page of the URL. For example, the URL http://www.amazon.com typed into a browser causes the browser to contact Amazon's server and request Amazon's home page.

Before the browser contacts Amazon's server, however, it searches the machine for a cookie file that Amazon has set. If it finds an Amazon cookie file, the browser will send all of the name-value pairs in the file to Amazon's server along with the URL. If it finds no cookie file, it will send no cookie data.

Amazon's Web server receives the cookie data and the request for a page. If name-value pairs are received, the Amazon server can use the data.

If no name-value pairs are received, the server equates this state with a first visit to Amazon.com. The Amazon server creates a new ID for the user in Amazon's database and then sends name-value pairs to the machine in the header for the Web page it sends. The machine stores the name-value pairs on its hard disk. The Web server can change name-value pairs or add new pairs whenever the user visits the site and requests a page.

There are other pieces of information that the server can send with the name-value pair. One of these is an expiration date. Another is a path so that the site can associate different cookie values with different parts of the site.

The user has control over the cookie process. The user can set an option in the browser so that the browser informs the user every time a site sends name-value pairs to the user. The user can then optionally accept or deny the values.

Cookies evolved because they solve a big problem for the people who implement Web sites. In the broadest sense, a cookie allows a site to store state information on a machine. This information lets a Web site remember what state the browser is in. An ID is one simple piece of state information—if an ID exists on the machine, the site knows that the user has visited before. The state is, "the browser has visited the site at least one time," and the site recognizes the user's ID from that visit.

Web sites use cookies in many different ways. Here are some of the most common examples:

Sites can accurately determine how many people actually visit the site. It turns out that because of proxy servers, caching, concentrators and so on, the only way for a site to accurately count visitors is to set a cookie with a unique ID for each visitor. Using cookies, sites can determine: how many visitors arrive; how many are new vs. repeat visitors; and how often a visitor has visited. The site does this is by using a database. The first time a visitor arrives, the site creates a new ID in the database and sends the ID as a cookie. The next time the user comes back, the site increments a counter associated with that ID in the database to indicate how many times that visitor returns.

Sites can store user preferences so that the site can look different for each visitor. This is often referred to as customization. Msn.com, for example, offers the user the ability to "change content/layout/color." MSN also allows the user to enter the user's zip code to get customized weather information. Upon entering the zip code for Raleigh-Durham, for example, the following name-value pair gets added to MSN's cookie file:

WEAT CC=NC%5FRaleigh%2DDurham®ION=www.msn.com/

Most sites seem to store preferences like this in the site's database and store nothing but an ID as a cookie. Storing the actual values in name-value pairs is an approach that has lost favor.

E-commerce sites can implement things like shopping carts and "quick checkout" options. The cookie contains an ID and lets the site keep track of the shopper as he or she adds different things to a shopping cart. Each item added to the cart is stored in the site's database along with the shopper's ID value. At check out, the site knows what is in the cart by retrieving all of the selections from the database. It would be impossible to implement a convenient web based shopping mechanism without cookies or something like them.

In all of these examples, the database is able to store is things the user has selected from the site, pages viewed from the site, information given to the site in online forms, and so forth. All of the information is stored in the site's database, and in most cases, a cookie containing the user's unique ID is all that is stored on the computer.

The present invention provides systems and methods for modifying the appearance of a viewer that displays the output of a digital content server. The viewer device has a processor for executing instructions and commands. The processor runs a first find and replace routine finds "include" tags in, for example, perl scripts and replaces the "include" tags with a default file that indicates the desired viewer appearance. A second find and replace routine operates prior to any manipulation or output by the server to the viewer and finds an include tag/ssi. The second routine replaces the include tag/ssi with a style sheet determined by either a cookie, or other unique identifier, set in the viewer device by the server or, in the event there is no cookie or unique identifier set by the server, by the default file set by the first routine. The unique identifier and the default file identify the desired viewer appearance and the viewer displays the desired appearance from the server.

The present invention may further be understood by reference to FIG. 1. FIG. 1 is a block diagram showing a flow chart of a method of an exemplary embodiment of the invention. A browser user at a home webpage activates affiliate link 110 or non-affiliate link 111 to, for example, a vendor webpage. A unique identifier, such as a cookie, is set in the user's machine at step S110. The unique identifier, according to the present invention, is text (like a cookie), a number, a pin number, an alphanumeric string from a user, or any such information that uniquely identifiers a user or a machine. In the case of computers, for example, the unique identifier is often a cookie. In the case of a cell phone, the unique identifier may be IMSI information or an MSISDN number. In the case of a digital television, the unique identifier may be an alphanumeric string or a pin chosen by the owner in a set up menu.

Absent the present invention, the user's browser would display the vendor's web page because the user has left the affiliate's home webpage. In accordance with the present invention, however, steps S120, in the case of an affiliate link, or step S121 in the case of a non-affiliate link, the vendor's website checks the user's machine or device 130 for a unique identifier either set by the affiliate website or already pre-existing on the user's device. If a unique identifier exists on the machine, step S131 determines whether output 140 is simple html or perl-generated html. If output 140 is simple html, step S141 reads the affiliate's unique identifier, e.g., cookie, with mycode1 by means of an include tag/SSI tag associated with a custom display 150 such as the home web page appearance. For a server-side include html output, for example, execution 141 of an include tag/SSI such as:

```
<!--#exec cgi="/cgi-bin/mycode1a.pl"-->
``` generates a custom web page layout. For a php include or required html output, execution 141 of an include or required tag such as:

```
<?PHP include("mycode1b.php");?>
```

```
<?PHP require("mycode1b.php");?>
``` generates the custom layout 150. The browser parses the default page extension (e.g., htm, html, shtml, etc.) for either SSI or PHP to display the correct custom format for the web page 150. Step S151 operates to display custom output 150. Step S142, however, operates if output 140 is perl-generated html. Perl scripts use the same templates as simple html (containing include/required tags or SSI, above) to generate a page. Absent the present invention, the browser would crash because it cannot parse the pl file for both perl and SSI or php. The present invention solves the problem by finding and replacing 142 the include/required tags or SSI with the custom information that would have been displayed by the include/required tags or SSI associated with the desired custom page layout 150. Step S152 operates to display custom output 150.

Continuing with FIG. 1, if a unique identifier does not exist on the user's device or machine, step S132 operates to determine whether the output is simple html or perl html 160. If the output is simple html, step S161, the present invention executes 160 an include tag/SSI default identifier associated with a desired default page layout 170. Step S170 displays default html output 170. If the output is per, step S162, the present invention finds and replaces the include tag/SSI with default information that would have been displayed by the include/required tags or SSI 162. Step S172 displays default output 170.

Application of the present invention is not limited to computers or web servers and browsers. The underlying logic of the invention, the use of short instructions to find and replace a particular style identifier with a selected style identifier, has application to any digital content viewer that displays content from a content server. Such viewers include televisions that are capable of displaying digital television content, picture phones and cell phones capable of displaying digital content such as jpeg, gif, tiff and television content, personal digital assistants (PDAs), and the like.

According to the foregoing, a specific embodiment of present invention is set forth below by way example to illustrate the software system and methods of the present invention. The example demonstrates how the present invention elegantly allows access of an e-commerce affiliate to a vendor's products via a link to the vendor's website while preserving the look and feel of the affiliate's website to such a satisfactory extent that the user is not aware that he or she has left the affiliate's site.

EXAMPLE

Actinic Catalog is an e-commerce server that outputs two types of files to the web browser:
1. simple html, and
2. perl-generated html in the form of, for example, rs000001.pl?SOURCE=REFERINGWEBID&DESTINATION=index.htm&PATH=./acatalog/&BASEURL=http://www.iadultsuperstore.com/acatalog/, or something similar.

The problem of displaying custom webmaster affiliate layout, including page layout, colors, fonts and links back to the originating webmaster pages, is solved using

```
<!--#exec cgi="/cgi-bin/mycode1a.pl"-->
``` for a server-side include generated html; or, for a php include or required html output,

```
<?PHP include("mycode1b.php");?>
```

```
<?PHP require("mycode1b.php");?>
```

The default page extension (ie. htm, html, shtml, etc.) can then be parsed for either SSI or PHP to display the correct format for the customers web browser.

The above strings fail, however, when the Actinic catalog server is required to output the second file type (.pl). The Actinic perl scripts use the same systems as the html for generating the page, so the

```
<?PHP include("mycode1b.php");?>
``` or

```
<!--#exec cgi="/cgi-bin/mycode1a.pl"-->
``` tags are also included in the .pl file. The .pl file, however, cannot be parsed for both perl and ssi or php. It can be parsed only for one or the other.

Inserting small pieces of code in the Actinic perl scripts solves the pl parsing problem. The small pieces of code replace the "include/require or SSI"tags with the appropriate text file that indicates the proper page layout. The text file is generated in the webmasters directory by an index.php script and is also used by the corresponding includes tag in the html.

An example of such a small "find and replace code" is provided below for the instance of custom css style sheets.

rs000001.pl sets a cookie in the user's web browser telling Actinic from which page the user originated. The cookie is then used by the SSI script, namely,

```
<!--#exec cgi="/cgi-bin/css.pl"-->
``` to display the appropriate style sheet as set forth below:

```
Remarks follow all "#"
<!-- start mycode1.pl renamed css.pl for ease of knowing
   what the program
is controlling--!>
#!usr/perl/bin/
# output is plain html txt
print "Content-Type: text/html\n\n";
# try to get the cookie
use CGI qw(:standard);
use CGI::Cookie;
%cookies = fetch CGI::Cookie;
# if the cookie exists do this
```

-continued

```
if(exists $cookies{'ACTINIC_SOURCE'})
{
$id = $cookies{'ACTINIC_SOURCE'}->value;
$css_style = "./webmasters/". $id ."/css.txt";
# custom style sheet generated by the refering webmasters
index.php
open(CSS, $css_style);
my @css_print = <CSS>;
print (@css_print)
}
# if the cookie does not exist do this
else
{
$css = "./cgi-bin/css.txt";
# default style sheet if no referring webmaster, i.e.,
direct hit to your store
open(CSS, $css);
my @css_print = <CSS>;
print (@css_print)
}
<!-- end css.pl -->
```

As indicated above, the script works in the standard html output of the Actinic Catalog.

A problem remains, however with the .pl files' output to the user's browser. Perl script cannot interpret the server-side includes statement <!--#exec cgi="/cgi-bin/css.pl"--> and, therefore, does nothing. The result is a complete breakdown of the css style sheet. The solution is provided by editing the Actinic perl scripts and including a "find and replace" routine before any manipulation or output of the string $sHTML. $sHTML is the default template, ie., Act_Primary.html or Act_PrimaryCheckout.html).

An example of such a find and replace routine is:

```
Remarks follow all "#"
<!-- start mycode2 --!>
# get the cookie if exists
use CGI qw(:standard);
use CGI::Cookie;
my %cookies = fetch CGI::Cookie;
# If the cookie exists do this
# find the ssi tag and replace it with the custom style sheet
generated by the
refering webmasters index.php
if(exists $cookies{'ACTINIC_SOURCE'})
{
my $id = $cookies{'ACTINIC_SOURCE'}->value;
my $SOURCE = $id;
my $css = "<!--#exec cgi=\"/cgi-bin/css.pl\"-->";
my $css_out = "./webmasters/". $SOURCE ."/css.txt";
open(CSS, $css_out);
my @css_print = <CSS>;
$sHTML =~ s/$css/@css_print/g;
}
# if the cookie does not exist do this
# find the ssi tag and replace it with the default style sheet
else
{
my $css = "<!--#exec cgi=\"/cgi-bin/css.pl\"-->";
my $css_out = "./cgi-bin/css.txt";
open(CSS, $css_out);
my @css_print = <CSS>;
$sHTML =~ s/$css/@css_print/g; }
```

The present invention contemplates a system for selecting the appearance of a display on a viewer that displays the output of a digital content server. The viewer runs on a machine with a processor for executing instructions. To display a selected or desired web page layout, the system of the present invention finds include tags and replaces the include tags with a default set of variables that indicates the desired display appearance. Prior to any manipulation or output by the server to the viewer, the system finds an include tag and replaces the include tag with new values that indicate the desired display appearance for variables determined by either (a) a unique identifier set in the machine by the server that identifies the desired display appearance; or, in the event there is no unique identifier set by the server, by (b) the default set of variables mentioned above. A viewer of the present invention, accordingly, displays the desired appearance.

A system of the present invention contemplates a great variety of viewers, such as a web browser, a television, a picture or camera telephone or wireless cell phone, a personal digital assistant (PDA), a console gaming viewer, or any viewer that displays content from a digital content server. Likewise, a great variety of servers are contemplated by the present invention, such as a web server, a digital television converter box that, for example, receives digital cable television content or digital satellite television content, gaming consoles and so forth.

Another embodiment of the present invention contemplates a machine with a viewer that displays digital output from a digital output server. Contemplated machines include, but are not limited to, computers, televisions, picture or camera phone, game consoles and so forth. Upon activation of a simple html output command to the server, a processor in the machine executes instructions to find at least one include tag for the server output and replace the at least one include tag with information determined by a unique identifier or absence of a unique identifier associated with at least one selected html display output. The machine displays the selected html output on the viewer.

Upon activation of a perl-generated html output command to the server the machine finds at least one include tag for the server output, searches for a unique identifier on the machine that is associated with at least one selected output display, replaces the include tag with the information determined by the unique identifier if the unique identifier is found or replaces the include tag with the default information mentioned above if the unique identifier is not found. The machine displays the selected html output on the viewer such as, for example, a web browser.

A further embodiment of the present invention contemplates a method for customizing the appearance of a display on a viewer of a machine having a processor for executing instructions. The display incorporates output from a content server in communication with the machine. Steps of a method of the present invention include but are not limited to:

(a) upon activation of a simple html output command to the server, finding at least one include tag for the server output;
(b) executing the at least one include tag with a default identifier associated with at least one selected html display output;
(c) displaying the selected html output on the viewer; or
(d) upon activation of a perl html output command to the server, finding at least one include tag for the server output;
(e) searching for a unique identifier on the machine, wherein the unique identifier is associated with at least one selected output display;
(f) replacing the include tag with the information determined by the unique identifier if the unique identifier is found;
(g) replacing the include tag with the default information of step (b) if the unique identifier is not found; and
(h) displaying the selected html output on the viewer.

It will be apparent to those of skill in the art that the same system can be used to generate custom menus, tables, colors, any appearance element at all for each referring cookie set by the rs000001.pl script. Moreover, by changing the variables, any referring cookie can be used to personalize the appearance of any database, images, or video streaming in the receiving browser or viewer that recognized the server's output, Html in this case of the above example. It will be further apparent that an advantage of the present invention is that the present invention does not require capturing a look and feel description of a host website, nor does the invention require storing such a description in a data store. Capturing the look and feel elements involves identifying and finding the actual executable commands for the elements, copying them to another location and then calling up the commands when they are needed. The present invention, in contrast, dynamically executes the look and feel elements of a host website by using a cookie on a host machine, or other text data, associated with the look and feel elements of a website, incorporating the text data into the output commands of the viewer scripting language and executing the commands. That is, the look and feel elements are executed directly from the browser executable scripts.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

In accordance with various embodiments of the present invention, the steps and methods described herein are intended, inter alia, for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission public telephone networks represent examples of the state of the art. Such standards are periodically superseded by faster or more efficient equivalents having essentially the same functions. Replacement standards and protocols having the same functions are considered equivalents. Accordingly, it is intended that the scope of the invention including such alternatives, modifications, and variations shall be defined by the appended claims.

I claim:

1. A method for displaying a web page in a web browser displayed by a machine in communication with a content server via a network, the method comprising the steps of:
    providing a first web page displayed by the browser and having a particular first page style that sets the layout and look and feel of the first web page, wherein the first web page further provides an active link to a second web page;
    providing a second web page displayed by the browser upon activation of the link provided by the first web page, the second web page having a particular second page style that sets the layout and look and feel of the second web page;
    identifying the first page style of the first web page;
    identifying the second page style of the second web page; and
    replacing the second page style on the second web page with the first page style of the first web page prior to output from the content server such that the second web page is displayed by the browser with the first page style of the first web page.

2. The method of claim 1 wherein the step of identifying the first page style of the first web page comprises finding on the machine a cookie associated with the first page style sheet.

3. The method of claim 1 wherein the step of replacing the second page style of the second web page with the first page style of the first web page prior to output from the content server comprises executing an include tag associated with the style sheet of the first web page when displaying the second web page.

4. The method of claim 1 wherein the look and feel set by the first style sheet comprises page layout, colors and fonts.

5. The method of claim 1 wherein the web page displayed by the browser comprises an html output.

6. The method of claim 1 wherein the web page displayed by the browser comprises a perl output.

7. The method of claim 1 wherein the machine comprises a personal computer.

8. The method of claim 1 wherein the machine comprises a television digital converter box.

9. The method of claim 1 wherein the machine comprises a game console.

10. The method of claim 1 wherein the machine comprises a phone.

11. A method for modifying the appearance of a vender web page having a vendor style sheet, wherein the vendor web page displays in a layout set by a home web page style sheet, the method comprising:
    providing a vendor web page server in a network;
    providing a home web page server in a network;
    providing a machine for displaying the vendor page and the home web page, wherein the machine is in communication with the server via the network,
    displaying the home web page wherein the home web page contains a link to the vendor web page;
    setting on the machine a cookie from the home web page, wherein the cookie determines the style sheet of the home web page;

activating the link to the vendor web page;

finding on the machine the cookie from the home web page;

replacing the style sheet of the vendor web page with the style sheet of the home web page determined by the cookie prior to displaying output from the vendor web page server so that the vendor web page displays in a layout set by the home web page style sheet; and displaying the vendor web page.

12. The method of claim 1 wherein the machine comprises a personal computer.

13. The method of claim 1 wherein the machine comprises a television digital converter box.

14. The method of claim 1 wherein the machine comprises a game console.

15. The method of claim 1 wherein the machine comprises a phone.

16. A system for modifying the appearance of a vender web page having a vendor style sheet, wherein the vendor web page displays in a layout set by a home web page style sheet, the system comprising:

a network;

a vendor web page server in the network;

a home web page server in the network;

a machine for displaying the vendor page and the home web page, wherein the machine comprises a processor for executing instructions and further wherein the machine is in communication with the home web page server and the vendor web page server via the network; and a tangible medium encoding instructions for execution by the processor, wherein the instructions cause the machine to execute the following actions:

display the home web page wherein the home web page contains a link to the vendor web page;

set on the machine a cookie from the home web page, wherein the cookie determines the style sheet of the home web page;

find on the machine the cookie from the home web page upon activation of the vendor web page link on the home web page;

replace the style sheet of the vendor web page with the style sheet of the home web page determined by the cookie prior to displaying output from the vendor web page server so that the vendor web page displays in a layout set by the home web page style sheet; and display the vendor web page with the layout set by the home page cookie.

17. The method of claim 16 wherein the machine comprises a personal computer.

18. The method of claim 16 wherein the machine comprises a television digital converter box.

19. The method of claim 16 wherein the machine comprises a game console.

20. The method of claim 16 wherein the machine comprises a phone.

\* \* \* \* \*

UNITED STATES PATENT AND TRADEMARK OFFICE
CERTIFICATE OF CORRECTION

| | | |
|---|---|---|
| PATENT NO. | : 7,464,332 B2 | Page 1 of 1 |
| APPLICATION NO. | : 10/716194 | |
| DATED | : December 9, 2008 | |
| INVENTOR(S) | : John Thomas Carter, II | |

It is certified that error appears in the above-identified patent and that said Letters Patent is hereby corrected as shown below:

In Col 13, lines 10, 12, 14, and 16 each occurrence of "claim 1" should be changed to --claim 11--.

In Col 14, lines 20, 22, 24, and 26 each occurrence of "method" should be changed to --system--.

Signed and Sealed this

Twenty-eighth Day of September, 2010

David J. Kappos
*Director of the United States Patent and Trademark Office*